United States Patent
Laselva et al.

(10) Patent No.: US 11,864,145 B2
(45) Date of Patent: Jan. 2, 2024

(54) NEIGHBOR CELL MEASUREMENT BASED TIMING ADVANCE VALIDATION

(71) Applicant: Nokia Technologies Oy, Espoo (FI)

(72) Inventors: Daniela Laselva, Klarup (DK); Oana-Elena Barbu, Aalborg (DK); Nuno Pratas, Gistrup (DK); Karri Markus Ranta-Aho, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 144 days.

(21) Appl. No.: 17/513,139

(22) Filed: Oct. 28, 2021

(65) Prior Publication Data
US 2022/0225257 A1    Jul. 14, 2022

Related U.S. Application Data

(60) Provisional application No. 63/137,014, filed on Jan. 13, 2021.

(51) Int. Cl.
*H04W 56/00* (2009.01)
*H04W 24/10* (2009.01)
*H04L 5/00* (2006.01)

(52) U.S. Cl.
CPC ....... *H04W 56/0045* (2013.01); *H04L 5/0073* (2013.01); *H04W 24/10* (2013.01); *H04W 56/007* (2013.01); *H04W 56/0095* (2013.01)

(58) Field of Classification Search
CPC ............. H04W 56/0045; H04W 24/10; H04W 56/007; H04W 56/0095; H04L 5/0073
See application file for complete search history.

(56) References Cited

U.S. PATENT DOCUMENTS

| | | | |
|---|---|---|---|
| 2021/0168746 A1* | 6/2021 | Mi | H04B 17/318 |
| 2021/0235407 A1* | 7/2021 | Zhang | H04W 74/0833 |
| 2021/0306968 A1* | 9/2021 | Liberg | H04B 17/318 |
| 2021/0315049 A1* | 10/2021 | Wei | H04W 76/27 |

(Continued)

OTHER PUBLICATIONS

"Work Item on NR smalldata transmissions in Inactive state", 3GPP TSG RAN Meeting #86, RP-193252, Agenda: 9.1.2, ZTE Corporation, Dec. 9-12, 2019, 4 pages.

(Continued)

*Primary Examiner* — Ricky Q Ngo
*Assistant Examiner* — Kabir U Jahangir
(74) *Attorney, Agent, or Firm* — SQUIRE PATTON BOGGS (US) LLP

(57) ABSTRACT

Systems, methods, apparatuses, and computer program products for neighbor cell measurement based timing advance validation. A method may include receiving a network configuration comprising a timing advance command from a network element. The method may also include acquiring at least measurement data of a serving cell relative to a first set of neighbor cells at a first time instance, and measurement data of the serving cell relative to a second set of neighbor cells at a second time instance according to the network configuration. The method may further include performing a timing advance validity check using at least the acquired measurement data from the first time instance and the second time instance. Further, the method may include performing data transmission based on a result of the timing advance validity check.

20 Claims, 10 Drawing Sheets

(56) References Cited

U.S. PATENT DOCUMENTS

| | | | | |
|---|---|---|---|---|
| 2021/0321226 | A1* | 10/2021 | Zhang | H04W 72/21 |
| 2022/0038997 | A1* | 2/2022 | Höglund | H04W 48/06 |
| 2022/0124659 | A1* | 4/2022 | Liberg | H04W 56/0055 |

OTHER PUBLICATIONS

"3rd Generation Partnership Project; Technical Specification Group Radio Access Network; NR; Physical channels and modulation (Release 16)", 3GPP TS 38.211, V16.3.0, Sep. 2020, pp. 1-133.

"3rd Generation Partnership Project; Technical Specification Group Radio Access Network; NR; Physical layer procedures for control (Release 16)", 3GPP TS 38.213, V16.3.0, Sep. 2020, pp. 1-179.

"3rd Generation Partnership Project; Technical Specification Group Services and System Aspects; Feasibility study on 5G message service for MIoT; Stage 1 (Release 16)", 3GPP TR 22.824, V16.0.0, Sep. 2018, pp. 1-27.

"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.2.1, Sep. 2020, pp. 1-1081.

"3rd Generation Partnership Project; Technical Specification Group Radio Access Network; Evolved Universal Terrestrial Radio Access (E-UTRA); User Equipment (UE) procedures in idle mode (Release 16)", 3GPP TS 36.304, V16.2.0, Sep. 2020, pp. 1-64.

"3rd Generation Partnership Project; Technical Specification Group Radio Access Network; NR; User Equipment (UE) procedures in Idle mode and RRC Inactive state (Release 16)", 3GPP TS 38.304, V16.2.0, Sep. 2020, pp. 1-39.

"3rd Generation Partnership Project; Technical Specification Group Radio Access Network; NR; Requirements for support of radio resource management (Release 16)", 3GPP TS 38.133, V16.5.0, Sep. 2020, 1608 pages.

"UL transmission in preconfigured resource", 3GPP TSG RAN WG1 Meeting #94bis, R1-1810089, Agenda: 6.2.1.2, Huawei, Oct. 8-12, 2018, 6 pages.

"LTE-M Pre-configured UL Resources Design Considerations", 3GPP TSG RAN WG1 Meeting #94bis, R1-1810489, Agenda: 6.2.1.2, Sierra Wireless, Oct. 8-12, 2018, 9 pages.

"Feature lead summary of Support for transmission in preconfigured UL resources", 3GPP TSG RAN WG1 Meeting #95, R1-1813717, Agenda: 6.2.2.2, Huawei, Nov. 12-16, 2018, 20 pages.

"Support for transmission in preconfigured UL resources in LTE-MTC", 3GPP TSG-RAN WG1 Meeting #94bis, R1-1810186, Agenda: 6.2.1.2, Ericsson, Oct. 8-12, 2018, pp. 1-8.

* cited by examiner

NEIGHBOR CELL MEASUREMENT BASED TIMING ADVANCE VALIDATION

CROSS REFERENCE TO RELATED APPLICATION

This application claims the benefit of U.S. Provisional Application No. 63/137,014, filed Jan. 13, 2021. The entire content of the above-referenced application is hereby incorporated by reference.

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for neighbor cell measurement based timing advance validation.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

SUMMARY

Some example embodiments may be directed to a method. The method may include receiving a network configuration including a timing advance command from a network element. The method may also include acquiring at least measurement data of a serving cell relative to a first set of neighbor cells at a first time instance, and measurement data of the serving cell relative to a second set of neighbor cells at a second time instance according to the network configuration. The method may further include performing a timing advance validity check using at least the acquired measurement data from the first time instance and the second time instance. In addition, the method may include performing data transmission based on a result of the timing advance validity check.

Other example embodiments may be directed to an apparatus. The apparatus may include at least one processor and at least one memory including computer program code. The at least one memory and computer program code may also be configured to, with the at least one processor, cause the apparatus at least to receive a network configuration including a timing advance command from a network element. The apparatus may also be caused to acquire at least measurement data of a serving cell relative to a first set of neighbor cells at a first time instance, and measurement data of the serving cell relative to a second set of neighbor cells at a second time instance according to the network configuration. The apparatus may further be caused to perform a timing advance validity check using at least the acquired measurement data from the first time instance and the second time instance. In addition, the apparatus may be caused to perform data transmission based on a result of the timing advance validity check.

Other example embodiments may be directed to an apparatus. The apparatus may include means for receiving a network configuration including a timing advance command from a network element. The apparatus may also include means for acquiring at least measurement data of a serving cell relative to a first set of neighbor cells at a first time instance, and measurement data of the serving cell relative to a second set of neighbor cells at a second time instance according to the network configuration. The apparatus may further include means for performing a timing advance validity check using at least the acquired measurement data from the first time instance and the second time instance. In addition, the apparatus may include means for performing data transmission based on a result of the timing advance validity check.

In accordance with other example embodiments, a non-transitory computer readable medium may be encoded with instructions that may, when executed in hardware, perform a method. The method may include receiving a network configuration including a timing advance command from a network element. The method may also include acquiring at least measurement data of a serving cell relative to a first set of neighbor cells at a first time instance, and measurement data of the serving cell relative to a second set of neighbor cells at a second time instance according to the network configuration. The method may further include performing a timing advance validity check using at least the acquired measurement data from the first time instance and the second time instance. In addition, the method may include performing data transmission based on a result of the timing advance validity check.

Other example embodiments may be directed to a computer program product that performs a method. The method may include receiving a network configuration including a timing advance command from a network element. The method may also include acquiring at least measurement data of a serving cell relative to a first set of neighbor cells at a first time instance, and measurement data of the serving cell relative to a second set of neighbor cells at a second time instance according to the network configuration. The method may further include performing a timing advance validity check using at least the acquired measurement data from the first time instance and the second time instance. In addition, the method may include performing data transmission based on a result of the timing advance validity check.

Other example embodiments may be directed to an apparatus that may include circuitry configured to receive a network configuration including a timing advance command from a network element. The apparatus may also include circuitry configured to acquire at least measurement data of a serving cell relative to a first set of neighbor cells at a first time instance, and measurement data of the serving cell relative to a second set of neighbor cells at a second time instance according to the network configuration. The apparatus may further include circuitry configured to perform a timing advance validity check using at least the acquired measurement data from the first time instance and the second time instance. In addition, the apparatus may include circuitry configured to perform data transmission based on a result of the timing advance validity check.

BRIEF DESCRIPTION OF THE DRAWINGS

For proper understanding of example embodiments, reference should be made to the accompanying drawings, wherein.

DETAILED DESCRIPTION

Figure 1:
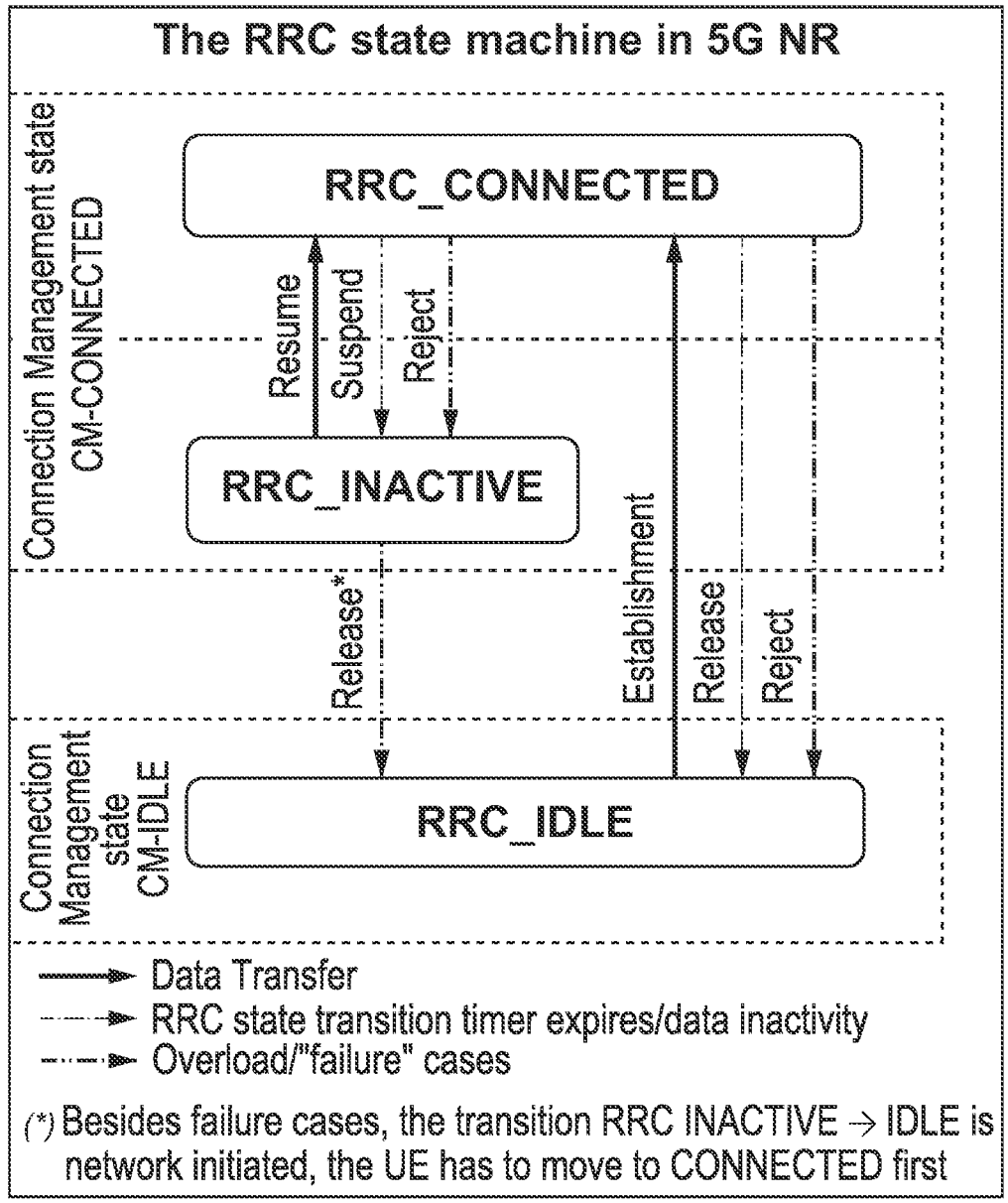
FIG. 1 illustrates an example of a NR radio resource control (RRC) state machine with RRC state transitions.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for neighbor cell measurement based timing advance validation.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

3$^{rd}$ Generation Partnership Project (3GPP) Rel-17 describes small data transmissions (SDTs), and how to avoid signaling overhead and delay associated with a transmission from radio resource control_INACTIVE (RRC_INACTIVE) to RRC_CONNECTED to perform a SDT. The introduction of RRC_INACTIVE state was to be able to transition user equipment (UEs) with infrequent data transmission to a state with minimum signaling overhead and power consumption.

According to 3GPP, for SDT in RRC_INACTIVE state, uplink (UL) SDT for random access channel (RACH)-based schemes may include a general procedure to enable user plane (UP) data transmission for small data packets from an INACTIVE state (e.g., using MSGA or MSG3). The UL SDT for RACH-based schemes may also include enabling flexible payload sizes larger than the Rel-16 common control channel (CCCH) message size that is possible currently for INACTIVE state for MSGA and MSG3 to support UP data transmission in UL (actual payload size may be up to network configuration). The UL SDT for RACH-based schemes may further include context fetch and data forwarding (with and without anchor relocation) in INACTIVE state for RACH-based solutions.

For the RRC_INACTIVE state, transmission of UL data on pre-configured PUSCH resources (i.e., reusing the configured grant type 1) when timing advance (TA) is valid may involve general procedure for SDT over configured grant type 1 resources from INACTIVE state. It may also involve configuration of the configured grant type 1 resources for SDT in UL for INACTIVE state. Thus, according to the above, three different modes may be supported for enabling SDT in Rel-17. One mode may include a 2-step RACH ("2-step RA SDT") where the MsgA physical uplink shared channel (PUSCH) is used to transmit the SDT payload. The second mode may include 4-step RACH ("4-step RA SDT") where Msg3 (PUSCH) is used to transmit the SDT payload. A third mode may include UL data on pre-configured PUSCH resources ("CG-SDT") where configured grant-based resources of type 1 may be used by the UE to transmit the SDT payload when it has a valid TA.

TA is the timing advance that the UE applies to UL transmissions. TA may be used to achieve sufficient timing alignment. In general, TA in cellular systems may be used to compensate for the propagation delay differences of UEs located at different distances from the base station. When time multiplexing different UEs, it is important for the UE furthest away to not have the end of its transmission burst overlap with the start of the UE that is next to transmit and is close to the base station. As such, the UE furthest away may be asked by the network to "advance" its UL transmission in time relative to its observed downlink (DL) time. In systems relying on orthogonal subcarriers and cyclic prefix (e.g., systems such as LTE and NR), the frequency multiplexing of two UL transmissions may be seen as received at (almost) the same timing. Thus, a TA adjustment may be used to compensate for propagation delay differences.

FIG. 1 illustrates an example of a NR RRC state machine with RRC state transitions. A new independent RRC state, referred to as RRC_INACTIVE state, may complement existing states including RRC_CONNECTED and RRC_IDLE states, with a goal of lean signaling and energy-efficient support of NR services. In certain cases, it may be beneficial to efficiently deliver small/infrequent traffic of enhanced mobile broadband (eMBB) and ultra-reliable low-latency communication (URLLC) services as well. The RRC_INACTIVE state may make it possible to more quickly resume the connection and start the transmission of small or sporadic data with lower initial access delay and associated signaling overhead as compared to the RRC_IDLE state. This may be achieved by reducing the control signaling required for requesting and obtaining the resume of a suspended RRC connection, which results in UE power saving. At the same time, a UE in RRC_INACTIVE state may be able to achieve similar power savings as in RRC_IDLE state, thus, benefiting from, for example, a larger period of physical downlink control channel (PDCCH) monitoring (e.g., paging) and relaxed measurements compared to RRC_CONNECTED state.

Furthermore, compared to keeping the UE in RRC_CONNECTED state, the new state can minimize mobility signaling both to the radio access network (RAN) (e.g., RRC measurement reporting, handover messages) and to the core network (e.g., to/from the access and mobility management function (AMF)). When the UE is moved to RRC_INACTIVE state via an RRC connection suspend message, the UE access stratum (AS) context (i.e., UE inactive AS context), necessary for the quick start of the connection, may be maintained both at the UE side and the RAN side. In addition, the UE AS may be identified by the UE identifier as an inactive-RNTI (I-RNTI). Further, the transition from the RRC_CONNECTED state to the RRC_INACTIVE state may be triggered by the gNB with the transmission of a RRCRelease message that includes the suspend configuration information (which includes I-RNTI, RAN-PagingCycle, RAN-NotificationAreaInfo and timer t380 that refers to the timer that control when the periodic RAN-based notification area update (RNAU) procedure occurs at the UE).

Figure 2A:
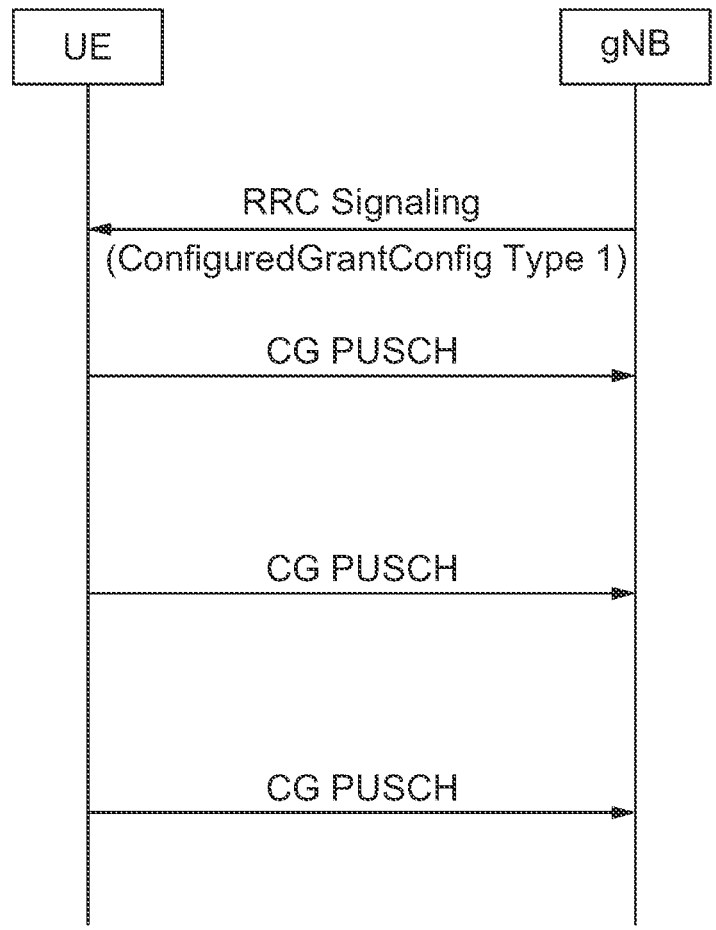
FIG. 2(a) illustrates an example of a signal flow diagram of configured grant type 1.
Figure 2B:
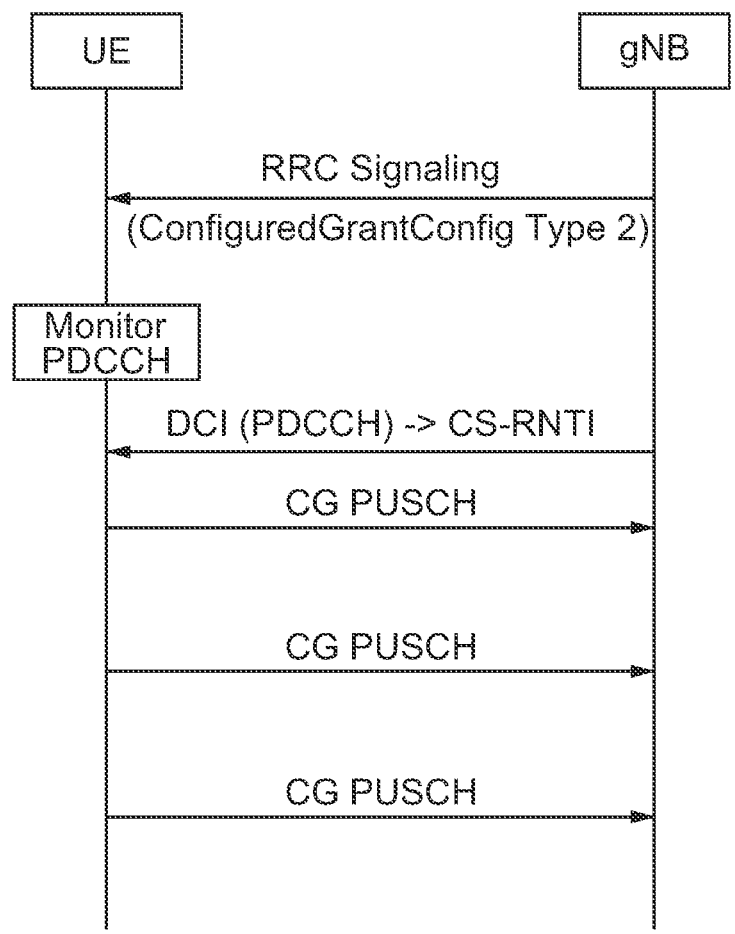
FIG. 2(b) illustrates an example of a signal flow diagram of configured grant type 2.

FIG. 2(a) illustrates an example of a signal flow diagram of configured grant type 1, and FIG. 2(b) illustrates an example of a signal flow diagram of configured grant type 2. As illustrated in FIG. 2(a), grant type 1 may be configured completely via RRC signaling including the periodicity and starting time. As illustrated in FIG. 2(b), grant type 2 may be partly configured via RRC signaling. However, the actual starting time in FIG. 2(b) may be triggered via the PDCCH. In NR, it may be possible to configure UL transmissions without the need to transmit a dynamic grant in correspondence of each UL transmission occasion. The configuration of these UL resources (i.e., configure grant (CG) PUSCH resources) may occur according to various schemes. The actual UL grant may either be configured via RRC (type 1) or provided via a combination of RRC and PDCCH (addressed to CS-RNTI) (type 2).

With regard to SDT, 3GPP agreements include SDT with RRC message supported as a baseline for RA-based and CG-based schemes. Further, data volume threshold may be used for the UE to decide whether to perform SDT. In determining data volume, an additional SDT specific reference signal received power (RSRP) threshold may be used to determine whether the UE should perform SDT. The agreements also include a new TA timer for TA maintenance specified for configured grant based small data transfer in RRC_INACTIVE state. Procedures may also be provided for the validity of TA and how to handle expiration of a TA timer which may be configured together with the CG configuration in the RRCRelease message. In other cases, the UE may use CG-based SDT if the user data is smaller than the data volume threshold, if CG resource is configured and valid, and/or when the UE has a valid TA.

It has been agreed in 3GPP to introduce support for the transmission of UL data on pre-configured PUSCH resources for UEs in RRC_INACTIVE state using CG-based resources of type 1, which may be denoted as CG-SDT and the corresponding resources as CG-SDT. Such resources may be configured for the UE using (RRC) dedicated signaling. However, a problem may exist in maintaining a valid TA to enable UL SDT using such CG-SDT resources to have sufficient timing alignment, thus extending the usage of the CG-SDT procedure for a UE. In this regard, 3GPP has agreed that a new TA timer for TA maintenance specified for CG-based small data transfer in RRC_INACTIVE state may be introduced, and further study may be on the procedure, the validity of TA, and how to handle expiration of a TA timer. As previously noted, the UE may use CG-based small data transfer if at least one of the following criteria is fulfilled: (1) user data is smaller than the data volume threshold; (2) CG-resource is configured and valid; and (3) UE has a valid TA.

In certain cases, the TA timer by itself may not be sufficient to validate if the UE still has a valid TA since the configured timer duration does not reflect the UE's mobility conditions. The UE, in some circumstances, may become misaligned before the TA timer expires, while in other circumstances, the UE may still be time-aligned when the TA timer expires. may still be time-aligned when the TA time expires.

In LTE NB-IoT's preconfigured uplink resource (PUR) feature, the timing advance and time alignment validation of the configured PUR resources may be made based on RSRP of the serving cell, and namely based on the comparison of the difference of the RSRP value of the serving cell measured at the time a PUR transmission has to be made against a reference RSRP value of the serving cell measured at the time the UE had a valid TA (reference RSRP). Whenever the observed RSRP variation is above the configured delta increase/decrease thresholds, the UE may deem that it no longer has a valid TA and, thus, cannot use its preconfigured resources for transmission.

Figure 3:
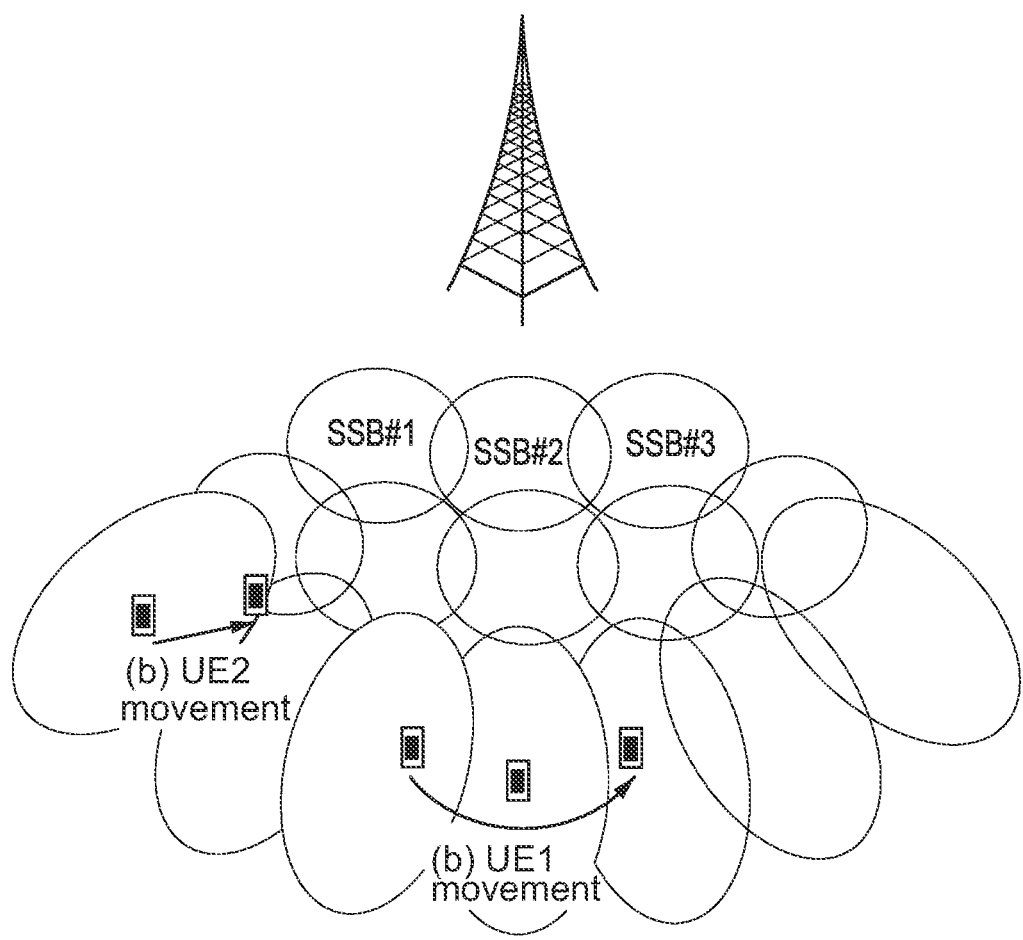
FIG. 3 illustrates examples of where beamforming can disrupt the measured reference signal received power (RSRP).

However, the same serving cell RSRP based TA validation criteria may not be sufficient in NR mainly because of the characteristics associated with the NR's beam based operation. FIG. 3 illustrates examples of where beamforming can disrupt the measured RSRP. As illustrated in FIG. 3, there may be situations where it is not possible to ascertain if the UE still has a valid TA. The ellipses illustrated in FIG. 3 represent the synchronization signal block (SSB) coverage projected to the ground. Specifically, in part (a) of FIG. 3, the UE may keep a constant RSRP by moving closer to the gNB, decreasing the pathloss. However, since the UE is also moving outside the main beamforming lobe, there is a corresponding beamforming gain decrease. This results in a net zero variation of the RSRP, and in turn, the UE cannot detect that the TA might no longer be valid since the RSRP does not vary. Whenever the UE encounters this situation, it may still use the CG-SDT resources despite the TA being invalid, which may result in interfering other transmissions in adjacent sub-frames, which is undesired.

In contrast, as seen in part (b) of FIG. 3, the UE may move in a circular trajectory around the gNB. As such, the UE may keep the same distance to the gNB, but transitions between SSBs. This may result in the UE observing a variation on the measured RSRP while still keeping a valid TA. As such, the examples illustrated in FIG. 3 show that the serving cell RSRP based TA validity detection alone may not be suitable in a NR system due to the multi-beam scenarios. Accordingly, there is a need to introduce a more robust detection of a TA misalignment in NR for CG-based SDT. In certain cases, some means to extend the TA validation based on measurements from neighbor cells in addition to the cells of serving cells have been described. However, these means are limited to a single neighbor cell, which may not be sufficient to ensure robustness in real network deployments.

In LTE, PUR based early data transmission (EDT) allows one UL transmission from RRC_IDLE state using a preconfigured UL resource (PUR) without performing the random access procedure. The TA validation criteria in PUR may depend on an RSRP change threshold. For example, a UE may consider the timing alignment value for transmission using PUR to be valid when the certain conditions are fulfilled. In certain cases, the conditions may include if pur-TimeAlignmentTimer is configured, and if pur-timeAlignmentTimer is running as confirmed by lower layers. In the case of when the pur-RSRP-ChangeThreshold is configured, since the last TA validation, the serving cell RSRP has not increased by more than rsrp-IncreaseThresh, and since the last TA validation, the serving cell RSRP has not decreased by more than rsrp-DecreaseThresh.

In PUR, the TA validation condition may be limited to the serving cell, which may have several shortcomings. Further, there may be several approaches based on neighbor cell measurements that have been described while designing TA validation for PUR including, for example, TA validity based on estimation of the UE position changing using neighboring cell measurements. In addition, neighbor cell RSRP change and serving cell's RSRP change has been described. For example, if the serving cell's RSRP changes by being greater than a threshold, the TA is invalid. In addition, if any neighbor cell RSRP changes by being greater than a threshold, the TA is invalid. This relates to the general idea of TA validation based on absolute RSRP values of a single pair of cells (serving cell+one neighbor cell). However, certain example embodiments described herein may consider that the condition is based on relative RSRP values, and may be applied to multiple cell pairs.

Figure 4:
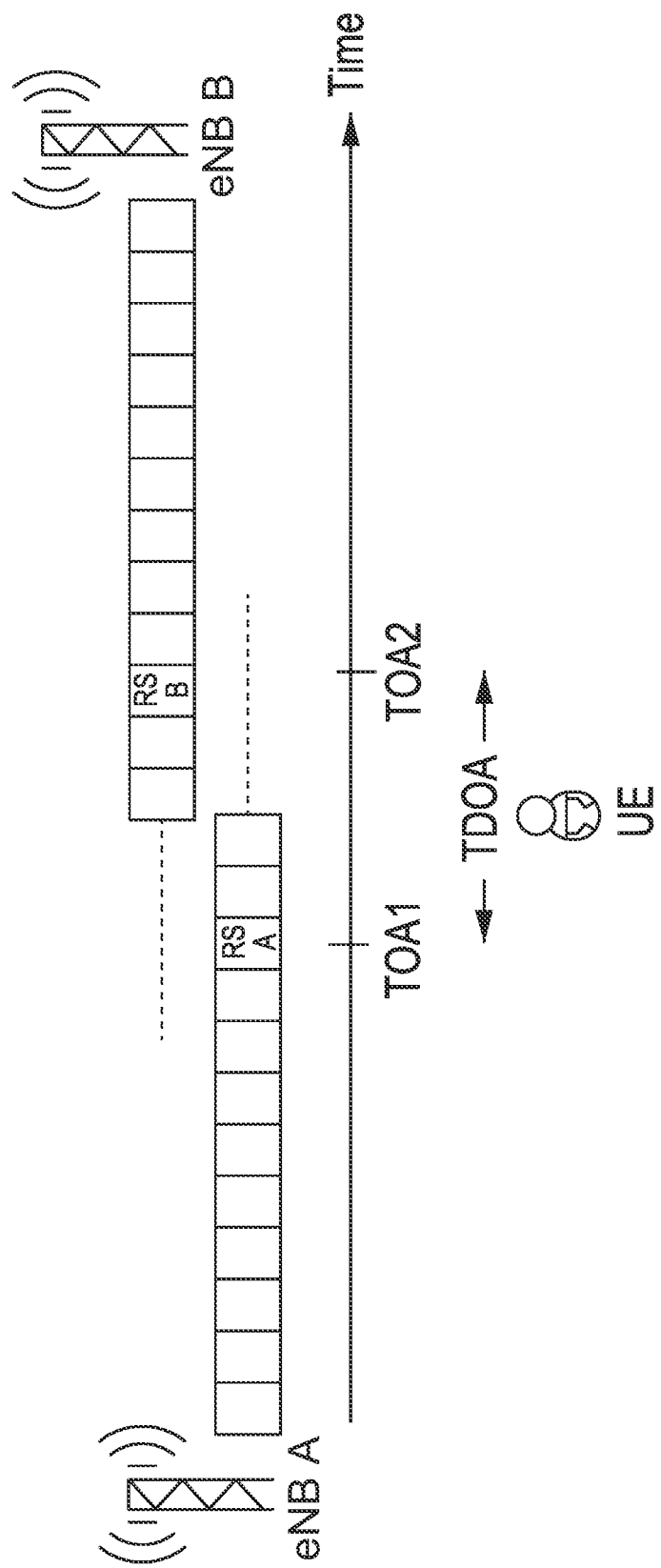
FIG. 4 illustrates an example of a user equipment (UE) that receives reference signals A and B transmitted from corresponding base stations.

FIG. 4 illustrates an example of a UE that receives reference signals A and B transmitted from corresponding base stations. In particular, as illustrated in FIG. 4, based on the time of arrival (TOA) of each of the reference signals, the UE can compute the time difference of arrival (TDOA) between the two reference signals. As each of the TOAs corresponds to the distance between the base station and the UE, the TDOA may serve as a strong indicator of mobility. Further, a time variant TDOA may indicate mobility, while a time invariant TDOA may indicate low or no mobility.

In cases where TDOA is greater than or equal to 2 eNBs, the general idea of TA validation may be based on TDOA of the DL reference signals between serving and neighbor cell(s), implemented to a single pair of cells. However, in certain example embodiments, consideration may be given to applying the TDOA to multiple cell pairs.

According to other cases, relaxed radio resource management (RRM) measurements monitoring rules may be applied to neighbor cells in NB-IoT in RRC_IDLE state. This may occur if camping cells do not drop below the SearchDeltaP in TsearchDelta, with reevaluation at least every 24-hours and not within the first 5 minutes after re-selection. In NR, RRM measurements relaxation of the neighbor cells measurements based on serving cell level may be performed based on S-measures/thresholds in RRC ide/inactive state. In 3GPP, such RRM measurement relaxation framework may be extended for not-at-cell-edge and low mobility conditions.

Certain example embodiments may provide a network controlled method that allows the UE to determine whether its current TA is still valid. According to certain example embodiments, use of TA validation conditions may be based on measurements obtained on a serving cell and one or more neighbor cells based on network control/assistance. For instance, in certain example embodiments, evaluation of TA conditions for more than one serving-neighbor cell pairs may provide robustness against situations in which the measurements related to a single pair of cells are unable to detect whether the UE has moved. As such, lack of TA validity may not be detected. Such an effect can be seen in, for example, colinear deployments, in which a pair of cells can be in the same line with the UE performing the measurements. Furthermore, the control of network (e.g., of the number of neighbor cells to which to apply the TA validation) may allow the possibility of minimizing additional evaluation effort and, thus, minimize the additional UE power and latency associated with those functions. In addition, network assistance may be optimized based on the network knowledge of the deployment and previous UE RRM/CSI reports including minimization of drive tests (MDT) (e.g., logged measurements for MDT).

According to certain example embodiments, reference measurements acquisition may take place at time to. In this case, when the UE is time-aligned with the network (e.g., the UE received a TA command as part of a previous CG transmission or together with the RRC release), the UE may acquire certain measurements with respect to a first set of neighbor cells S1 in addition to its own serving cell. The measurements may be performed as configured by the network in the CG-SDT configuration, or as written in the specifications. In other example embodiments, the configuration may include the measurement type (e.g., RSRP, SSB's TOA), whether the measurements should be beam level or cell level, the minimum neighbor cell set size, the minimum required cell set overlap between measurements, and the minimum RSRP for a neighbor cell to be considered into the neighbor cell set.

In certain example embodiments, the UE may store the acquired reference measurements while the UE is in RRC_INACTIVE state. For instance, the measurements may be stored in the UE context at the UE side. Furthermore, if the UE initiates the procedure to move to RRC_IDLE state or RRC_CONNECTED state, it may discard the stored measurements.

According to certain example embodiments, a TA validation check may be performed at time t1. For instance, when the TA validation is to be checked (e.g., prior to a CG-based SDT transmission), the UE may acquire new measurement values with respect to its serving cell and a set of neighbor cells that it currently detects. The UE may then check whether it fulfills the related TA conditions based on a comparison of the new values against the stored values. In certain example embodiments, the set of neighbor cells detected may be at least partially overlapping with the first set S1 for which reference measurements are stored. The overlapping cells in both sets form the second set of neighbor cells S2. In some example embodiments, if the second set S2 is empty or below the configured minimum required cell set overlap, then the TA may be assumed to be not valid without any further check. For example, if the set of neighbor cells currently detected is not at least partially overlapping with the reference set, it may be determined that the UE has moved significantly from the UE's previous location and, thus, its current TA cannot be valid. According to certain example embodiments, the overlap may correspond to two sets that have common members (i.e., neighbor cells).

In certain example embodiments, if the second set S2 is not empty and above the configured minimum required cell set overlap, then TA validity may be determined based on the following TA condition may be evaluated and met for each pair of serving cell and neighbor cell $n_i$ in S2:

$$(\text{Measure}_s(t_1)-\text{Measure}_{n_i}(t_1))-(\text{Measure}_s(t_0)-\text{Measure}_{n_i}(t_0))<\text{deltaThreshold} \quad (1)$$

In some example embodiments, the deltaThreshold value may be provided by the network to the UE as part of the network configuration for the TA validation check. For instance, in certain example embodiments, the deltaThreshold may be between 3 dB and 15 dB. The same threshold value may also be valid for other thresholds described herein. In other example embodiments, for relative comparison between two cells, the corresponding threshold value may be lower than when comparing a single cell (e.g., as in equation (2)) because of measurement accuracy.

According to certain example embodiments, the network may define the minimum and/or maximum number of pairs of neighbor cells for which the condition above has to be evaluated. Further, the above conditions may be satisfied in addition to the PUR-alike serving RSRP change based condition:

$$\text{RSRP}_s(t_1)-\text{RSRP}_s(t_0)<\text{rsrpIncreaseThr} \quad (2)$$

If the TA conditions are met, the UE may assume the TA as valid, and may use the valid CG-SDT resources. Otherwise, the UE is not allowed to use those resources, and may need to fall back to RACH-based SDT transmission.

Figure 5:
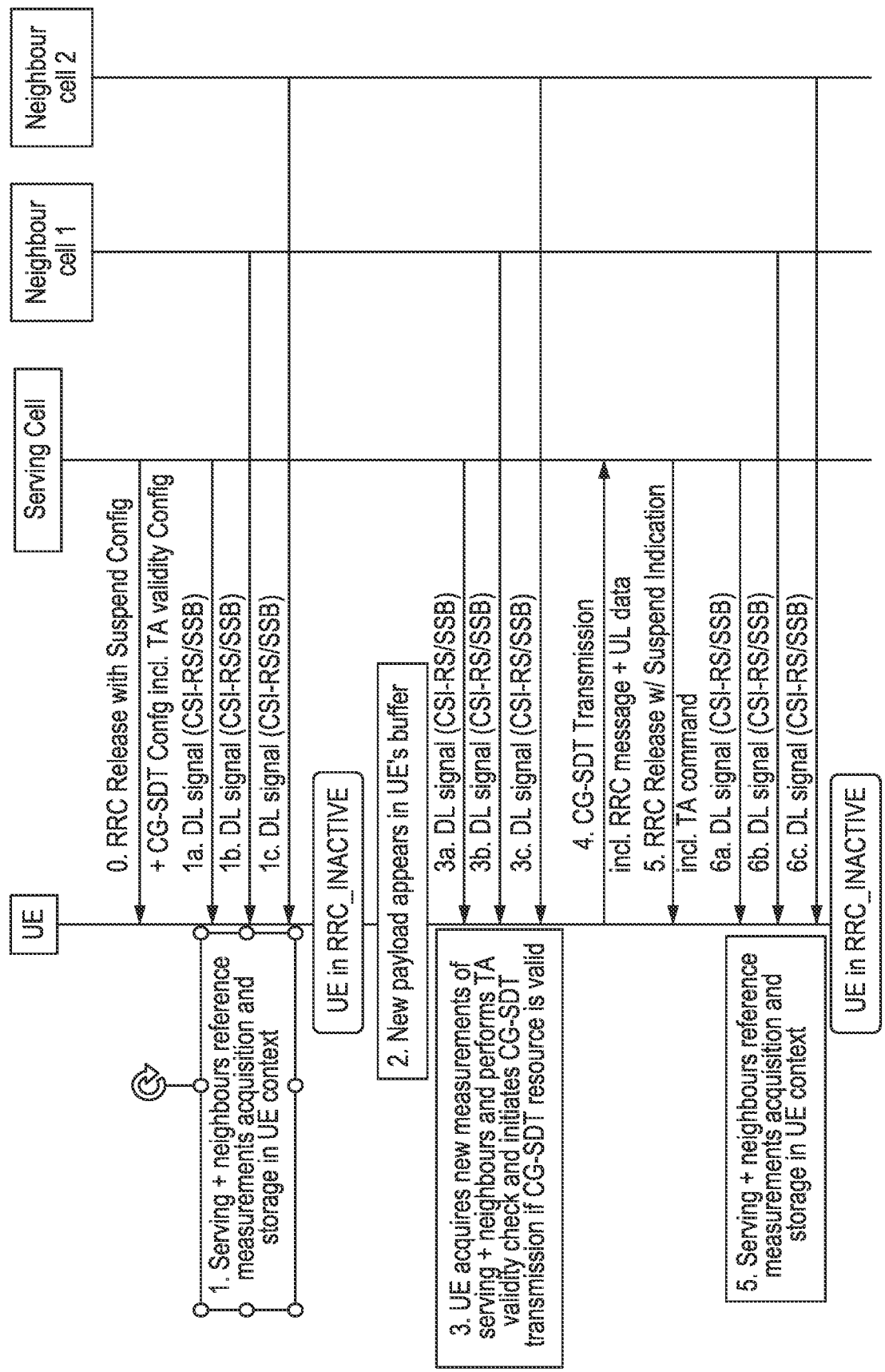
FIG. 5 illustrates an example signal flow diagram of a sequence of messages, according to certain example embodiments.

FIG. 5 illustrates an example signal flow diagram of a sequence of messages, according to certain example embodiments. As illustrated in FIG. 5, at 0, the serving cell may send network configuration in the form of a RRC release message to the UE, and the RRC release message may include suspend configuration, CG-SDT configuration, and TA validity configuration. At 1a, 1b, and 1c, the UE may receive DL signals from the severing cell, neighbor cell 1 and neighbor cell 2. At 1, the UE may obtain serving, neighbor cell 1, and neighbor cell 2 reference measurements, and store them in the UE context in the UE side. While the UE is in RRC_INACTIVE state, at 2, a new payload may appear in the UE's buffer. At 3a, 3b, and 3c, the UE may receive DL signals from the serving cell, neighbor cell 1, and neighbor cell 2. At 3, the UE may acquire new measurements of the serving cell, neighbor cell 1, and neighbor cell 2, and perform a TA validity check. The UE may also initiate a CG-SDT transmission if the CG-SDT resource is valid.

As further illustrated in FIG. 5, at 4, the UE may perform a CG-SDT transmission to the serving cell, and the transmission may include an RRC message and UL data. In response, at 5, the serving cell may send a RRC release message with a suspend indication that includes a TA command to the UE. At 6a, 6b, and 6c, the UE may receive DL signals from the serving cell, neighbor cell 1, and neighbor cell 2. At 6, the UE may obtain the serving cell and neighbor cells' reference measurements, and store them in the UE context.

According to certain example embodiments, the measurement type used for TA validation may include RSRP. In certain example embodiments, UEs in RRC idle/inactive state may relax intra-/inter-frequency neighbor measurements at the cell center where CG-based SDT is assumed to operate (RSRP threshold to be defined for resource validity check of CG-based SDT). Thus, there may be an increase of UE power from measuring additional neighbor cells, at times when the UE is allowed to otherwise omit RRM measurements of neighbor cells. However, the associated power may be limited/negligible as it may be performed before an UL SDT transmission (which are expected to not occur that often) and for a limited subset of neighbors, where the network can control, for example, the subset size based on its knowledge of the deployment and previous UE RRM/CSI reports. Additionally, certain example embodiments may be enhanced such that the neighbor cells conditions may not need to be performed before each and every SDT transmission.

According to certain example embodiments, under the RSRP TA validation measurement type, the TA validation may be based on lack of change in time of the RSRP difference between one or more pair of serving and neighbor cells. According to certain example embodiments, the TA validation condition for each pair of serving-neighbor cell $n_i$ may be defined as:

$$\text{dRSRP}(s,n_i,t_1,t0)=|[\text{RSRP}_s(t_1)-\text{RSRP}_{n_i}(t_1)]-[\text{RSRP}_s(t_0)-\text{RSRP}_{n_i}(t_0)]|<\text{RSRPChangeThreshold} \quad (3)$$

According to the above condition (3), if the UE has not moved, the delta in RSRP, RSRP(s, $n_i$, $t_1$, t0), may be 0. Thus, the RSRPdeltaThreshold may be set to a relatively small value to accommodate for limited UE movement and non-idealities/errors. In certain example embodiments, evaluating the condition (3) on more than one pair of serving and neighbor cells may allow for detection of cases where the UE may have moved. However, where this movement may not be detected may be if the RSRP variation was detected towards the serving cell or a limited number of serving and neighbor cells.

In certain example embodiments, despite no RSRP measurement accuracy being defined for the UEs in RRC inactive/idle state, the RSRP relative accuracy may be expected to be higher than the absolute accuracy also in these RRC states, similarly to the RRC_CONNECTED state. As compared to applying the RSRP increase condition to two cells separately, an advantage provided by certain example embodiments is that a relative RSRP measurement may be used. For example, the relative RSRP measurement may entail the relative comparison of two measurement values, each corresponding to a different node, which can be more accurate than two absolute RSRP measurements, each having a limited accuracy. Tables 1 and 2 below provides a summary of the NR UE RSRP accuracy requirements. Specifically, Table 1 provides intra-frequency synchronization signal-reference signal received power (SS-RSRP) requirements, and Table 2 provides SSB/CSI-RS L1-RSRP requirements under normal conditions. As can be seen from Tables 1 and 2, the UEs in RRC_INACTIVE state measure SS-RSRP (i.e., RSRP based on SSB), and may also measure, additionally or alternatively, RSRP based on CSI-RS.

TABLE 1

| SS-RSRP Requirements | | |
| --- | --- | --- |
| SS-RSRP | FR1 | FR2 |
| Absolute accuracy* | ±4.5 dB | ±6 dB |
| Relative Accuracy** | ±2 dB | ±6 dB |

*Applies to a cell on the same carrier frequency as used by the serving cell.
**RSRP from one cell in comparison to RSRP measured on another cell at the same frequency.

TABLE 2

| SSB/CSI-RS L1-RSRP Requirements | | |
| --- | --- | --- |
| L1-RSRP | FR1 | FR2 |
| Absolute accuracy* | ±5 dB | ±6.5 dB |
| Relative Accuracy** | ±3 dB | ±6.5 dB |

*Applies to a cell on the same carrier frequency as used by the serving cell.
**RSRP from one cell in comparison to RSRP measured on another cell at the same frequency.

According to other example embodiments, the TA validation may be based on a lack of change of the RSRP in time per node. For example, the same conditions may apply to the serving cell and one neighbor cell. However, in certain example embodiments, the same TA validation conditions may be applied and evaluated for the serving cell and as many relevant neighbor cells $n_i$ based on network configuration (e.g., neighbor cells may be include in the set S2 of neighbor cells configured for TA validation, a minimum number of neighbor cells may be evaluated and alike). In certain example embodiments, the conditions for the serving cell and a generic neighbor cell $n_i$ may include the following:

$dRSRP(s,t_0,t_1) = RSRP_s$
$(t_1 \text{''around TA validation trigger time } t1)^-$
$RSRP_s(t_0 \text{''within a time window T when TA is valid, around } t0) < \text{rsrpIncreaseThr1}$ (4)

$dRSRP(n_i,t_0,t_1) = RSRP_{n_i}$
$(t_1 \text{''around TA validation trigger time } t1)^-$
$RSRP_{n_i}(t_0 \text{''within a time window T when TA is valid, around } t0) < \text{rsrpIncreaseThr2}$ (5)

According to certain example embodiments, if the UE has not moved, the delta in RSRP in both the serving cell and neighbor cells may be 0. The additional conditions on multiple neighbor cells allow to detect the cases where the UE has actually moved, despite the RSRP value in the serving cell not having changed because of beamforming issues.

Figure 6:
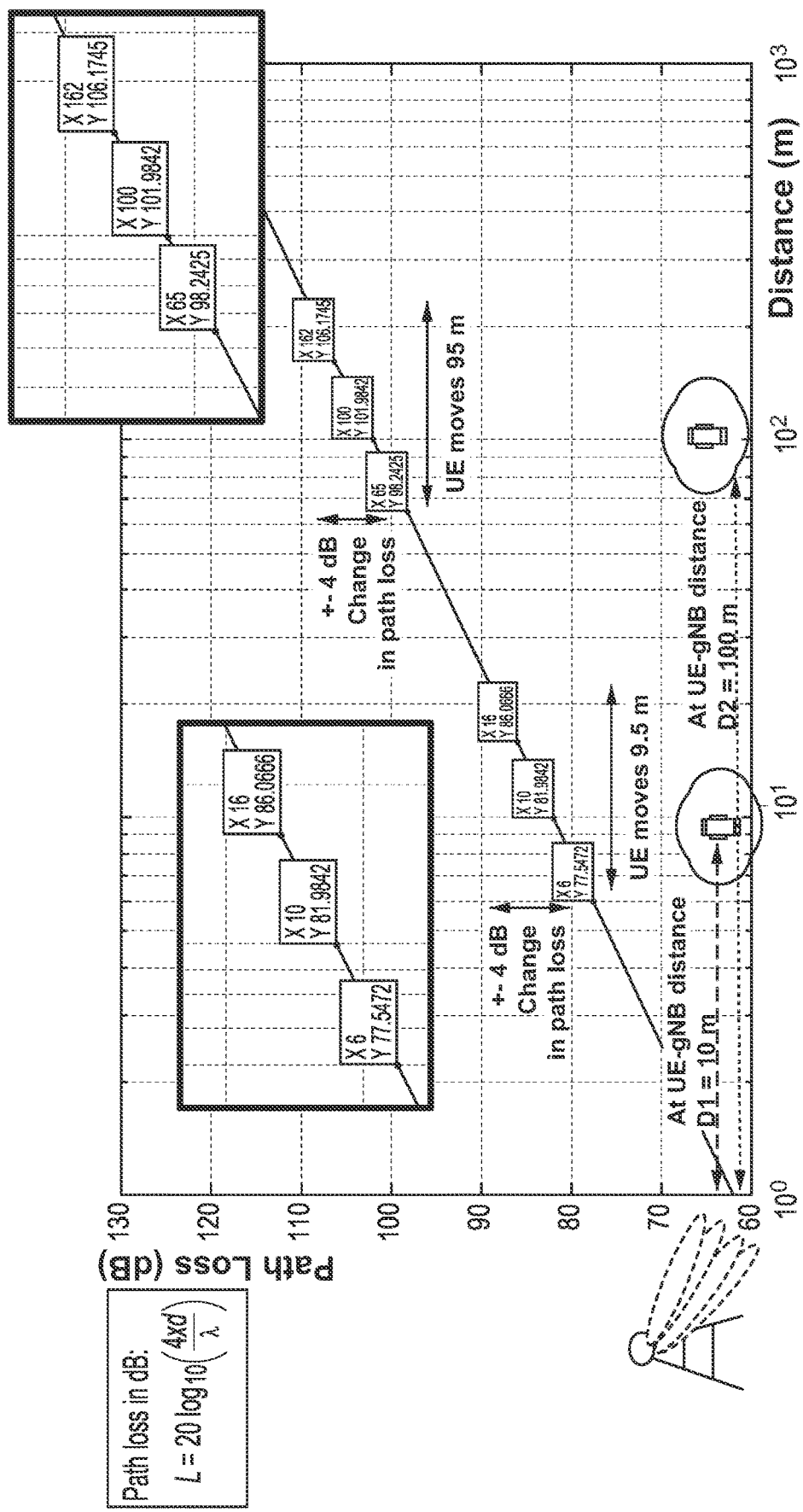
FIG. 6 illustrates a UE distance dependent change in RSRP, according to certain example embodiments.

FIG. 6 illustrates a UE distance dependent change in RSRP, according to certain example embodiments. In particular, FIG. 6 illustrates that the RSRP may change due to the UE movement, which may be less pronounced at the cell edge than at the cell center. FIG. 6 also illustrates that the same RSRP change of about 4 dB may be due to a ~10 m movement when the UE is at the cell center, or a ~100 m movement when the UE is at the cell edge. Thus, the setting of the thresholds with regard to the serving cell (to which the UE may be closer) and neighbor cells (to which the UE may be farther away) may take into account this distance-dependent effect.

According to certain example embodiments, the measurement type used for TA validation may include the TOA of a DL signal, which may be assumed to be the SSB. However, in other example embodiments, other DL signals may be used as well. According certain example embodiments, the TOA may be based on the reception time of the primary synchronization signal/secondary synchronization signal (PSS/SSS) associated with the SSB. The TA validation condition may then be based on the change between measurement time instances $t_0$ and $t_1$, in relation to the difference between the TOA of the serving cell's SSB ($toa_s$) and the TOA of the SSB of neighbor cell $toa_{n_i}$. This condition may be formulated as the following:

$dtoa(s,n_i,t_1,t_0) = |\lfloor toa_s(t_1) - toa_{n_i}(t_1) \rfloor - \lfloor toa_s(t_0) - toa_{n_i}(t_0) \rfloor| \le \text{ToAChangeThreshold}$ (6)

Similarly with the above implementation, this validation condition may be applied to multiple serving cell and neighboring cell pairs based on the related network configuration.

In certain example embodiments, when the TDOA is applied to a single pair of cells, it may be possible that the gNBs/TRPs associated with these cells are collinear with each other (i.e., they may be in the same line with the UE performing the measurements), which may result in the TDOA of a single pair of cells being unable to detect if the UE has moved. Thus, in certain cases, a TA validity using a single cell pair TDOA may not be sufficient to ensure robustness in real network deployments.

Figure 7:
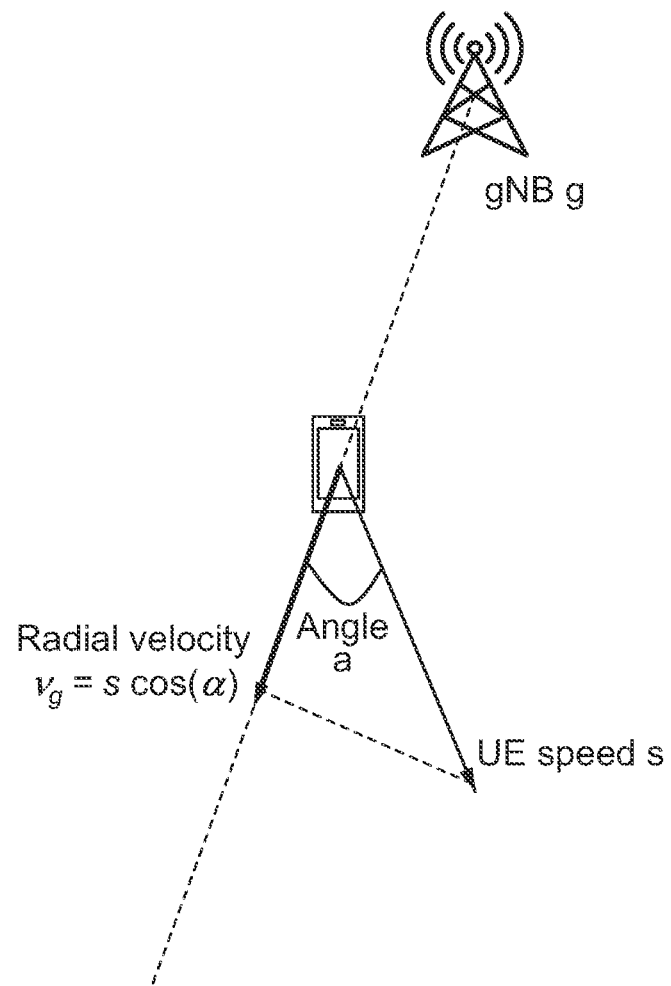
FIG. 7 illustrates movement of a UE with respect to a cell/gNB, according to certain example embodiments.

FIG. 7 illustrates movement of a UE with respect to a cell/gNB, according to certain example embodiments. In certain example embodiments, the TA validation condition for each pair of serving-neighbor cells $n_i$ may be computed as follows:

$$toa(s, n_i, t_1, t_0) = |\lceil toa_s(t_1) - toa_{n_i}(t_1) \rceil - \lceil toa_s(t_0) - toa_{n_i}(t_0) \rceil| \quad (7)$$

$$= dtoa(s, ni, t_0) + \frac{(v_s - v_{n_i})}{c}(t_1 - t_0)$$

As shown in equation (7), c may correspond to the speed of light, and $v_s$ and $v_{n_i}$ may correspond to the velocities of the UE in respect to the TRPs of its serving cell (gNB) s and its neighbor cell (gNB) respectively. The radial velocity of the UE with respect to the TRPs of a cell/gNB g may be expressed based on the traveled distance dg with respect to the cell/gNB g as:

$$v_g = \frac{(d_q)}{t1 - t0} = s\cos(a) \quad (8)$$

The differential TOA in equation (7) is constant over time if the UE has not moved as desired. Evaluating the condition on more than one pair of cells allows to detect cases where it may appear constant over time even though the UE is moving such as when the following occurs: (1) the UE radial velocities are zeros, $$\text{i.e., } a_s = a_{n_i} = \frac{\pi}{2}$$

in Eq. (7)→$v_s = v_{n_i} = 0$; and (2) the UE has moved in such a way that the radial velocities fulfill $v_s = v_{n_i} \ne 0$.

According to certain example embodiments, the measurement may represent differential TOA and differential RSRP. For instance, in this implementation, the UE may check at least a condition related to a differential RSRP and at least a condition related to the differential TOA based conditions. This combined check may be done for a smaller set of cells, for example, if both differentials are constant over time, for one pair, it may be sufficient.

In certain example embodiments, in the application of either the measurement being differential RSRP or the measurement being differential TOA to multiple pairs of cells, the network (NW) may define a rule that allows the UEs to make the decision if the TA is valid based on the number of cell pairs where the associated condition was evaluated (i.e., relative RSRP below a threshold). This rule may include whether cell pairs meet the condition, or that at least N pairs out of M meet the condition.

According to certain example embodiments, the neighbor cells' conditions may not need to be performed before each and every SDT transmission. Instead, whether to apply the TA validation or whether to apply TA validation conditions of neighbor cells may be based on either the interspacing between either two subsequent transmissions, or the time of receiving a TA offset from the network versus the time of performing a first SDT transmission.

In certain example embodiments, a time-based control may be provided that provides the ability to omit the neighbor cell conditions if the TA timer is below a certain value. Based on that, when a UE is performing, for example, periodic CG-based SDT transmissions every 50 ms, it may perform serving cell and neighbor cell based TA validation for the first transmission only, but it may not need to evaluate any neighbor cell conditions for the subsequent SDT transmissions/procedures as long as the TA timer (TAT) is less than TAT thr=1,000 ms. Such optimization may also make it possible to limit the latency increase that may be associated with the measurements of neighbor cells.

Figure 8:
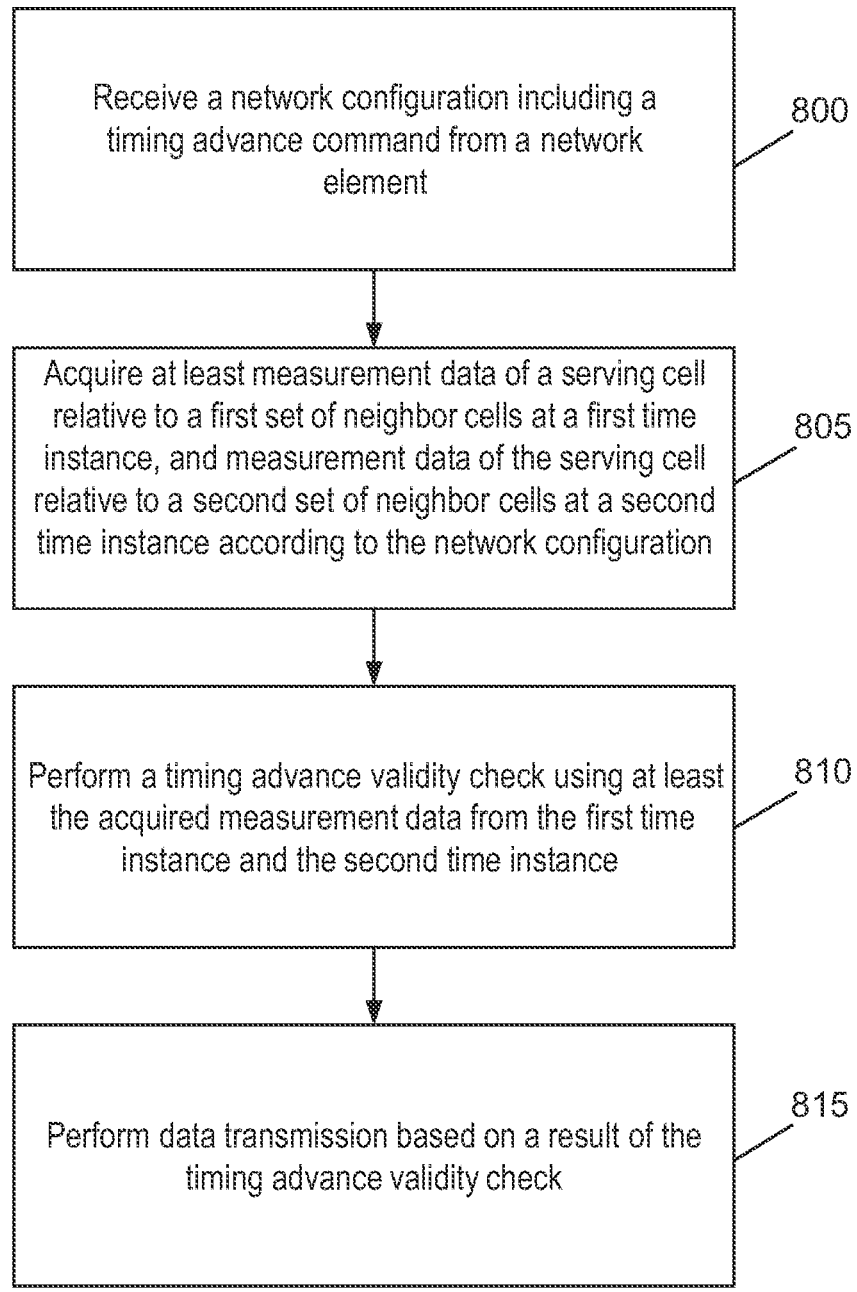
FIG. 8 illustrates a flow diagram of a method, according to certain example embodiments.

FIG. 8 illustrates a flow diagram of a method, according to certain example embodiments. In certain example embodiments, the flow diagram of FIG. 8 may be performed by a network entity or network node in a 3GPP system, such as LTE or 5G-NR. For instance, in an example embodiment, the method of FIG. 8 may be performed by a UE, for instance similar to apparatuses 10 or 20 illustrated in FIGS. 9(a) and 9(b).

According to certain example embodiments, the method of FIG. 8 may include, at 800, receiving a network configuration comprising a timing advance command from a network element. The method may also include, at 805, acquiring at least measurement data of a serving cell relative to a first set of neighbor cells at a first time instance, and measurement data of the serving cell relative to a second set of neighbor cells at a second time instance according to the network configuration. The method may further include, at 810, performing a timing advance validity check using at least the acquired measurement data from the first time instance and the second time instance. In addition, the method may include, at 815, performing data transmission based on a result of the timing advance validity check.

According to certain example embodiments, the method may further include entering an inactive or idle state in response to receiving the network configuration. In certain example embodiments, the timing advance validity check and the data transmission may be performed in an inactive state. According to other example embodiments, the method may also include storing the acquired measurement data in a context when in an inactive or idle state. In certain example embodiments, the timing advance validity check may include checking the measurement data acquired at the first time instance against the measurement data acquired at the second time instance to determine whether one or more timing advance conditions are satisfied. In other example embodiments, the timing advance may be determined to be valid when the one or more timing advance conditions are satisfied, and the timing advance may be determined to be invalid when the one or more timing advance conditions are not satisfied.

In further example embodiments, the one or more timing advance conditions may include at least one of whether the first set of neighbor cells at the first time instance contains at least a threshold of the neighbor cells from the second set of neighbor cells at the second time instance, whether a difference between measurement data acquired at the second time instance and the first time instance is less than a predefined threshold value for the measurement data, whether a difference between a reference signal received power at the second time instance and a reference signal received power at the first time instance is less than a predefined threshold value for the reference signal received power, whether a difference between a differential reference signal received power at the second time instance and a differential reference signal received power at the first time instance is less than a predefined threshold value for the differential reference signal received power, and whether a difference between a differential time-of-arrival of a downlink signal at the second time instance and a differential time-of-arrival of the downlink signal at the first time instance is less than a predefined threshold value for the differential time-of-arrival.

In certain example embodiments, the one or more timing advance conditions may include at least two timing advance conditions associated with the measurement data of the serving cell relative to a first neighbor cell and a second neighbor cell. According to certain example embodiments, the network configuration may include at least one of a measurement type associated with the acquired measurement data to perform the timing advance validity check, an identification of whether measurements should be beam level or cell level, a minimum neighbor cell set size, a minimum required cell set size, which contains a minimum number of common members between measurement instances, a cell set that comprises a minimum number of common members between measurement time instances, a minimum number of timing advance conditions to perform the timing advance validity check, information relating to omitting one or more timing advance conditions associated with at least more neighbor cell in the neighbor cell set, one or more thresholds associated with the one or more timing advance conditions, and a minimum reference signal received power for one of the one or more neighbor cells. In some example embodiments, the minimum number of timing advance conditions may include at least two timing advance conditions associated with the measurement data of the serving cell relative to a first neighbor cell and a second neighbor cell. According to other example embodiments, the measurement type may include a reference signal received power, a time-of-arrival of a downlink signal, or a combination of the reference signal received power and the time-of-arrival of the downlink signal. According to further example embodiments, the downlink signal may include a synchronization signal block a demodulation reference signal, or any other reference signal.

Figure 9A:
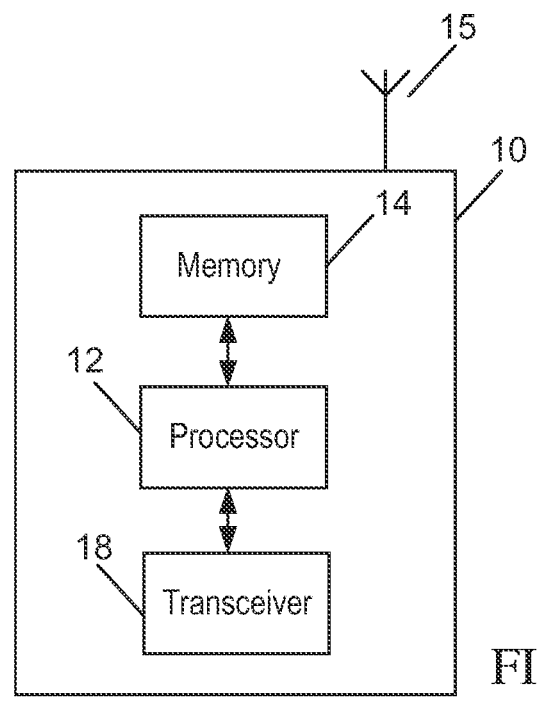
FIG. 9(a) illustrates an apparatus, according to certain example embodiments.

FIG. 9(a) illustrates an apparatus 10 according to certain example embodiments. In certain example embodiments, apparatus 10 may be a node or element in a communications network or associated with such a network, such as a UE, mobile equipment (ME), mobile station, mobile device, stationary device, IoT device, or other device. In other example embodiments, apparatus 10 may be a network element, node, host, server in a communication network or serving such a network. It should be noted that one of ordinary skill in the art would understand that apparatus 10 may include components or features not shown in FIG. 9(a)

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 9(*a*).

As illustrated in the example of FIG. 9(*a*), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 9(*a*), multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-8.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-8.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

As discussed above, according to certain example embodiments, apparatus 10 may be a UE, for example. According to certain example embodiments, apparatus 10 may be controlled by memory 14 and processor 12 to perform the functions associated with example embodiments described herein. For instance, in certain example embodiments, apparatus 10 may be controlled by memory 14 and processor 12 to receive a network configuration comprising a timing advance command from a network element. Apparatus 10 may also be controlled by memory 14 and processor 12 to acquire at least measurement data of a serving cell relative to a first set of neighbor cells at a first time instance, and measurement data of the serving cell relative to a second set of neighbor cells at a second time instance according to the network configuration. Apparatus 10 may further be controlled by memory 14 and processor 12 to perform a timing advance validity check using at least the acquired measurement data from the first time instance and the second time instance. In addition, apparatus 10 may be controlled by memory 14 and processor 12 to perform data transmission based on a result of the timing advance validity check.

FIG. 9(*b*) illustrates an apparatus 20 according to certain example embodiments. In certain example embodiments, the apparatus 20 may be a node or element in a communications network or associated with such a network, such as a base station, a Node B, an evolved Node B (eNB), 5G Node B or access point, next generation Node B (NG-NB or gNB), and/or WLAN access point, associated with a radio access network (RAN), such as an LTE network, 5G or NR. It should be noted that one of ordinary skill in the art would understand that apparatus 20 may include components or features not shown in FIG. 9(*b*)

Figure 9B:
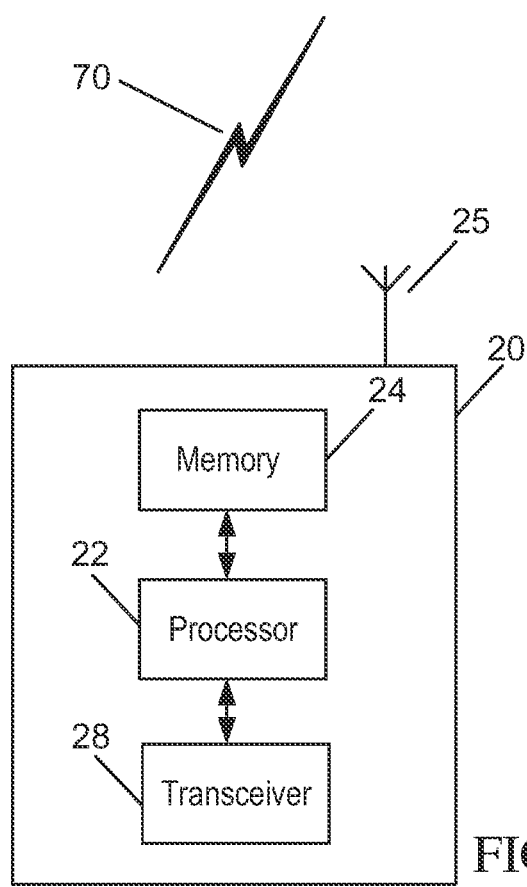
FIG. 9(b) illustrates another apparatus, according to certain example embodiments.

As illustrated in the example of FIG. 9(b), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 9(b), multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods described herein.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a network element, node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. According to certain embodiments, apparatus 20 may be controlled by memory 24 and processor 22 to perform the functions associated with any of the embodiments described herein.

Further example embodiments may provide means for performing any of the functions, steps, or procedures described herein. For example one example embodiment may be directed to an apparatus that includes means for receiving a network configuration comprising a timing advance command from a network element. The apparatus may also include means for means for acquiring at least measurement data of a serving cell relative to a first set of neighbor cells at a first time instance, and measurement data of the serving cell relative to a second set of neighbor cells at a second time instance according to the network configuration. The apparatus may further include means for performing a timing advance validity check using at least the acquired measurement data from the first time instance and the second time instance. In addition, the apparatus may include means for performing data transmission based on a result of the timing advance validity check.

Certain example embodiments described herein provide several technical improvements, enhancements, and/or advantages. In some example embodiments, it may be possible to provide a simple approach that allows the UE to detect the TA validity while overcoming the challenges related to performing the RSRP check with regard to the serving cell. It may also be possible to provide an alternative implementation based on the difference of time of arrivals of the SSBs of the serving cell and neighboring cells, which is not as dependent of the channel conditions as the RSRP-based method. According to other example embodiments, using TA validation based on multiple cells rather than the serving cell only is beneficial because it may allow for the use of relative measures (i.e., relative comparison of the measurement value of the serving cell versus the neighbor cell, or taking one measurement from a pair of cells) rather than absolute measures. It is also beneficial as it may allow to detect colinear scenarios where the UE movement may not be detected based on a single cell, thus making it more robust. Since SDT in NR may often be used by mobile devices requiring background traffic exchanges of eMBB applications, it may be desirable to have a more robust TA validation.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary
3GPP 3rd Generation Partnership Project
5GC 5G Core
CG Configured Grant
CSI-RS Channel Status Indication-Reference Signal
EDT Early Data Transmission
eNB Enhanced Node B
gNB 5G or Next Generation NodeB
MAC CE Medium Access Control Element
NR New Radio
PCG Pre-configured Grant
PDP Power Delay Profile
PSS Primary Synchronization Signal
PUSCH Physical Uplink Shared Channel
PUR Periodic Uplink Resources
RA Random Access
RACH Random Access Channel
RAN Radio Access Network
RRC Radio Resource Control
RRM Radio Resource Management
RSRP Reference Signal Received Power
SDT Small Data Transmission
SI System Information
SIB System Information Block
SSB Synchronization Signal Block
SSS Secondary Synchronization Signal
TA Timing Advance
TOA Time of Arrival
TRP Transmission and Reception Point
UE User Equipment

We claim:
1. A method, comprising:
receiving a network configuration comprising a timing advance command from a network element;
acquiring at least measurement data of a serving cell relative to a first set of neighbor cells at a first time instance, and measurement data of the serving cell relative to a second set of neighbor cells at a second time instance according to the network configuration, wherein the first set of neighbor cells at the first time instance contains a threshold subset number of the neighbor cells from the second set of neighbor cells at the second time instance;
performing a timing advance validity check using at least the acquired measurement data from the first time instance and the second time instance; and
performing data transmission based on a result of the timing advance validity check.

2. The method according to claim 1, further comprising entering an inactive or idle state in response to receiving the network configuration.

3. The method according to claim 1, wherein the timing advance validity check and the data transmission are performed in an inactive or idle state.

4. The method according to claim 1, further comprising storing the acquired measurement data in a context when in an inactive or idle state.

5. The method according to claim 1, wherein the timing advance validity check comprises checking the measurement data acquired at the first time instance against the measurement data acquired at the second time instance to determine whether one or more timing advance conditions are satisfied.

6. The method according to claim 5,
wherein the timing advance is determined to be valid when the one or more timing advance conditions are satisfied, and
wherein the timing advance is determined to be invalid when the one or more timing advance conditions are not satisfied.

7. The method according to claim 5, wherein the one or more timing advance conditions comprises at least one of
whether a difference between measurement data acquired at the second time instance and the first time instance is less than a predefined threshold value for the measurement data,
whether a difference between a reference signal received power at the second time instance and a reference signal received power at the first time instance is less than a predefined threshold value for the reference signal received power,
whether a difference between a differential reference signal received power at the second time instance and a differential reference signal received power at the first time instance is less than a predefined threshold value for the differential reference signal received power, or
whether a difference between a differential time-of-arrival of a downlink signal at the second time instance and a differential time-of-arrival of the downlink signal at the first time instance is less than a predefined threshold value for the differential time-of-arrival.

8. The method according to claim 1, wherein the network configuration comprises at least one of
a measurement type associated with the acquired measurement data to perform the timing advance validity check,
an identification of whether measurements should be beam level or cell level,
a minimum neighbor cell set size,
a minimum required cell set size, which contains a minimum number of common members between measurement time instances,
a cell set that comprises a minimum number of common members between measurement time instances,
a minimum number of timing advance conditions to perform the timing advance validity check,
information relating to omitting one or more timing advance conditions associated with at least more neighbor cell in the neighbor cell set,
one or more thresholds associated with the one or more timing advance conditions, or
a minimum reference signal received power for one of the one or more neighbor cells.

9. An apparatus, comprising:
at least one processor; and
at least one memory comprising computer program code,
the at least one memory and the computer program code are configured, with the at least one processor, to cause the apparatus at least to
receive a network configuration comprising a timing advance command from a network element;
acquire at least measurement data of a serving cell relative to a first set of neighbor cells at a first time instance, and measurement data of the serving cell relative to a second set of neighbor cells at a second time instance according to the network configuration, wherein the first set of neighbor cells at the first time instance contains a threshold subset number of the neighbor cells from the second set of neighbor cells at the second time instance;
perform a timing advance validity check using at least the acquired measurement data from the first time instance and the second time instance; and
perform data transmission based on a result of the timing advance validity check.

10. The apparatus according to claim 9, wherein the at least one memory and the computer program code are further configured, with the at least one processor, to cause the apparatus at least to enter an inactive or idle state in response to receiving the network configuration.

11. The apparatus according to claim 9, wherein the timing advance validity check and the data transmission are performed in an inactive or idle state.

12. The apparatus according to claim 9, wherein the at least one memory and the computer program code are further configured, with the at least one processor, to cause the apparatus at least to store the acquired measurement data in a context when in an inactive or idle state.

13. The apparatus according to claim 9, wherein the timing advance validity check comprises checking the measurement data acquired at the first time instance against the measurement data acquired at the second time instance to determine whether one or more timing advance conditions are satisfied.

14. The apparatus according to claim 13,
wherein the timing advance is determined to be valid when the one or more timing advance conditions are satisfied, and
wherein the timing advance is determined to be invalid when the one or more timing advance conditions are not satisfied.

15. The apparatus according to claim 13, wherein the one or more timing advance conditions comprises at least one of
whether a difference between measurement data acquired at the second time instance and the first time instance is less than a predefined threshold value for the measurement data,
whether a difference between a reference signal received power at the second time instance and a reference signal received power at the first time instance is less than a predefined threshold value for the reference signal received power,
whether a difference between a differential reference signal received power at the second time instance and a differential reference signal received power at the first time instance is less than a predefined threshold value for the differential reference signal received power, or
whether a difference between a differential time-of-arrival of a downlink signal at the second time instance and a differential time-of-arrival of the downlink signal at the first time instance is less than a predefined threshold value for the differential time-of-arrival.

16. The apparatus according to claim 13, wherein the one or more timing advance conditions comprises at least two timing advance conditions associated with the measurement data of the serving cell relative to a first neighbor cell and a second neighbor cell.

17. The apparatus according to claim 9, wherein the network configuration comprises at least one of
- a measurement type associated with the acquired measurement data to perform the timing advance validity check,
- an identification of whether measurements should be beam level or cell level,
- a minimum neighbor cell set size,
- a minimum required cell set size, which contains a minimum number of common members between measurement time instances,
- a cell set that comprises a minimum number of common members between measurement time instances,
- a minimum number of timing advance conditions to perform the timing advance validity check,
- information relating to omitting one or more timing advance conditions associated with at least more neighbor cell in the neighbor cell set,
- one or more thresholds associated with the one or more timing advance conditions, or
- a minimum reference signal received power for one of the one or more neighbor cells.

18. The apparatus according to claim 17, wherein the minimum number of timing advance conditions comprises at least two timing advance conditions associated with the measurement data of the serving cell relative to a first neighbor cell and a second neighbor cell.

19. The apparatus according to claim 17, wherein the measurement type comprises:
- a reference signal received power;
- a time-of-arrival of a downlink signal; or
- a combination of the reference signal received power and the time-of-arrival of the downlink signal.

20. A computer program product comprising a non-transitory computer-readable storage medium bearing computer program code embodied therein for use with a computer, the computer program code comprising code for performing:
- receiving a network configuration comprising a timing advance command from a network element;
- acquiring at least measurement data of a serving cell relative to a first set of neighbor cells at a first time instance, and measurement data of the serving cell relative to a second set of neighbor cells at a second time instance according to the network configuration, wherein the first set of neighbor cells at the first time instance contains a threshold subset number of the neighbor cells from the second set of neighbor cells at the second time instance;
- performing a timing advance validity check using at least the acquired measurement data from the first time instance and the second time instance; and
- performing data transmission based on a result of the timing advance validity check.

* * * * *